United States Patent [19]

Lwee

[11] Patent Number: 5,499,925
[45] Date of Patent: Mar. 19, 1996

[54] CONNECTOR DEVICE

[75] Inventor: Nai H. Lwee, Fremont, Calif.

[73] Assignee: E. I. Du Pont de Nemours and Company, Wilmington, Del.

[21] Appl. No.: 216,471

[22] Filed: Mar. 22, 1994

Related U.S. Application Data

[63] Continuation of Ser. No. 26,711, Mar. 5, 1993, abandoned.

[30] Foreign Application Priority Data

Mar. 6, 1992 [JP] Japan ................. 4-011468 U

[51] Int. Cl.⁶ .................................................. H01R 13/62
[52] U.S. Cl. .................................. 439/157; 439/155
[58] Field of Search ......................... 439/152–160, 439/372

[56] References Cited

U.S. PATENT DOCUMENTS

| | | | |
|---|---|---|---|
| 4,778,401 | 10/1988 | Boudreau et al. | 439/157 |
| 4,875,867 | 10/1989 | Hoo | 439/157 |
| 4,952,161 | 8/1990 | Komatsu | 439/159 |
| 5,026,296 | 6/1991 | Hashiguchi | 439/159 |
| 5,051,101 | 9/1991 | Komatsu | 439/159 |
| 5,145,389 | 9/1992 | Okubo | 439/159 |
| 5,179,505 | 1/1993 | Matsuo | 439/159 |
| 5,197,894 | 3/1993 | Koike | 439/159 |
| 5,208,942 | 5/1993 | Simon | 439/157 |

OTHER PUBLICATIONS

UK Search Report, Application No. GB9304443.6, Jun. 29, 1993.

*Primary Examiner*—David L. Pirlot
*Attorney, Agent, or Firm*—Woodcock Washburn Kurtz Mackiewicz & Norris

[57] ABSTRACT

A connector device includes a housing having a slide plate with a handle. By the manual operation of the handle, the slide plate is moved by a disengageable link mechanism along the length of the housing. When a data storage medium is fully inserted in the connector device and the handle is in a first position, the link mechanism is disengaged. The link mechanism becomes engaged, and thereby operable to move the slide plate, only after the handle is moved from the first position to an extended position. In this manner, inadvertent ejection of the data storage medium is prevented.

16 Claims, 8 Drawing Sheets

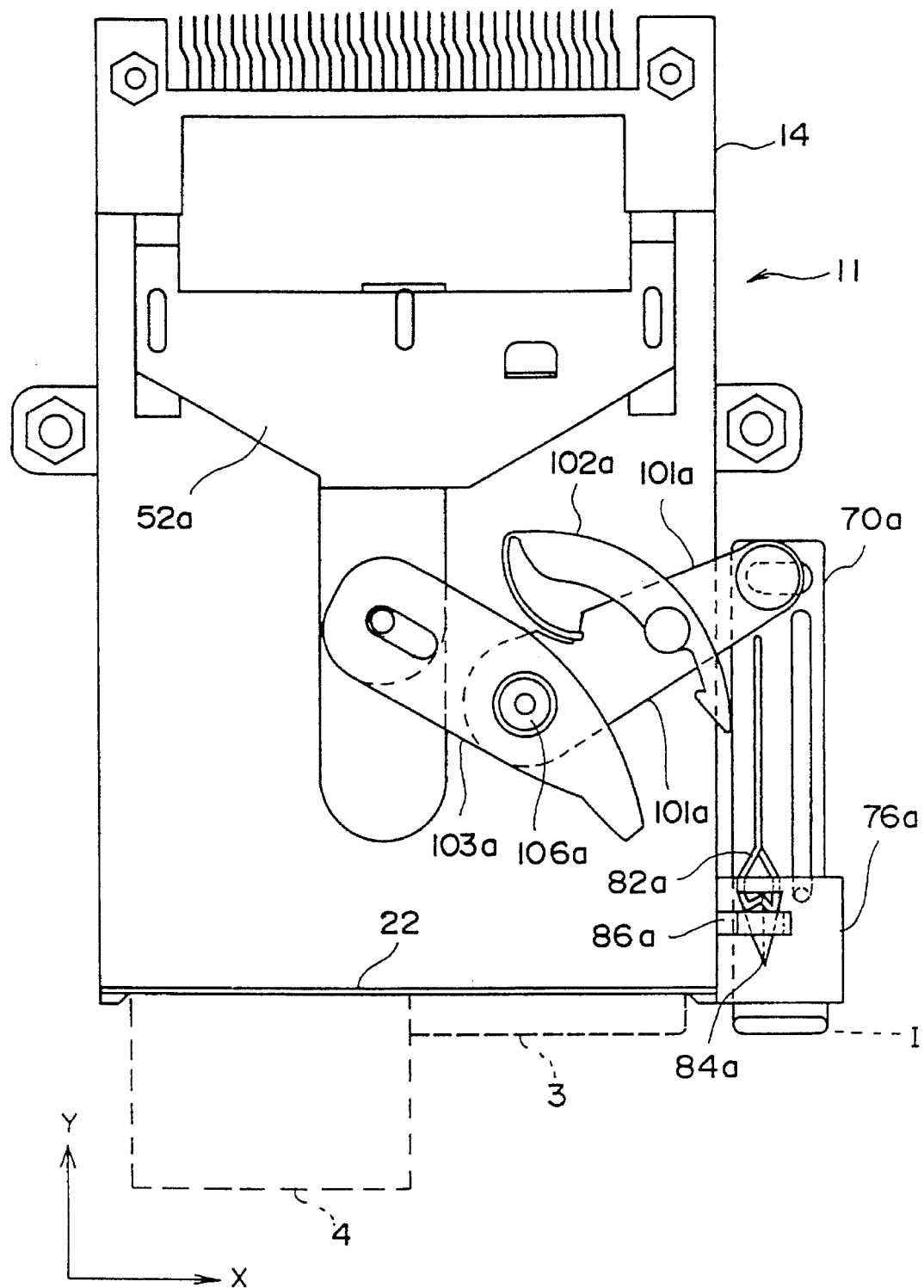
F I G. 7

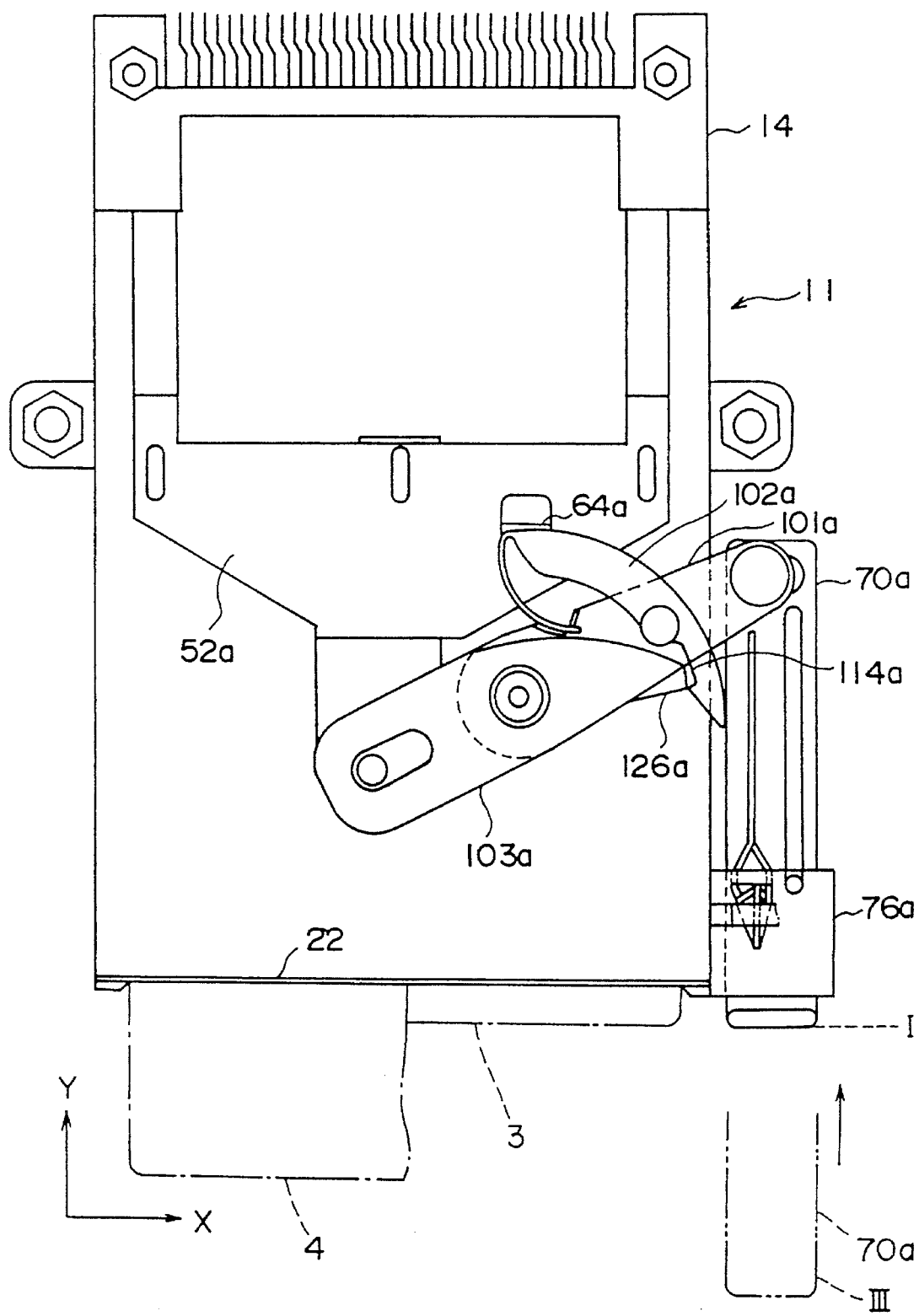
F I G. 8

CONNECTOR DEVICE

This is a continuation of application Ser. No. 08/026,711, filed Mar. 5, 1993, now abandoned.

BACKGROUND OF THE INVENTION

1. Field of the Invention

The present invention relates to a connector device which can detachably connect a data storage medium, such as a memory card and hard disc drive package, to personal, laptop and notebook computers and other peripheral devices.

2. Description of the Related Art

Published Unexamined Japanese Utility Model Registration 63-69375 discloses one of this type of conventional connector devices.

The connector device includes a housing having an insertion hole at one end when viewed in its longitudinal direction and connector body connected to the other end of the housing. The top surface of the housing has a slide plate slidable along the longitudinal direction of the housing. The slide plate has a hook capable of being engaged with the data storage medium via the top plate of the housing. A movable member, such as an ejection button, is mounted on the side surface of the housing such that it is slidable along the longitudinal direction of the housing.

The slide plate and movable member are connected such that they slide in mutually opposite directions. Specifically, the movable member is connected to the slide plate by a lever rotatably mounted on the top surface of the housing.

The connector device is mounted in a casing of, for example, a notebook computer. In this mount state, the movable member of the connector device can be withdrawn out of the housing of the notebook computer clear of the forward end of the housing.

When the movable member is withdrawn from the housing, the slide plate is moved toward the connector body side. At this time, the data storage medium is pushed toward the connector body side by the hook of the slide plate to achieve an electrical and mechanical connection to the connector device. By so doing, the data storage medium is connected to the notebook computer.

When, on the other hand, the movable member is pushed into the housing, the slide plate is moved toward the insertion opening side. With the movement of the slide plate, the data storage medium is withdrawn away from the connector body side and then clear of the insertion hole so that it is disconnected from the notebook computer.

When a data storage medium is fully inserted in the connector device, the movable member protrudes from the casing. Since the protruding movable member is subject to accidental impacts or shocks or liable to be inadvertently operated, there is a risk that the data storage medium will be inadvertently disconnected during operation of the computer system.

During operation, the data storage medium, such as a hard disc drive package in particular, needs to be kept connected to the connector device. Any inadvertent disconnection may render the computer system inoperative.

SUMMARY OF THE INVENTION

It is accordingly an object of the present invention to provide a connector device which ensures added safety for data protection because no movable member is projected during the operative connection of a data storage medium.

In order to achieve the object of the present invention, there is provided a connector device for connecting to a data storage medium comprising a pair of opposing side walls spaced at an interval substantially equal to the width of the data storage medium, and a connector body provided at one end of the opposing side walls that has at least one group of contact pins disposed therein for connecting to the data storage medium. According to the present invention, a disengageable release mechanism is provided for ejecting the data storage medium from the connector device upon manual operation of an ejection handle. The release mechanism is disengaged, and therefore inoperable, when a data storage medium is fully inserted in the connector device and the ejection handle is in a first position. The release mechanism becomes engaged, and therefore operable to eject the data storage device, only after the ejection handle is manually moved from the first position to an extended position. Because the ejection handle must be moved from the first position to the extended position in order to engage the release mechanism, inadvertent ejection of the data storage medium is avoided.

In a preferred embodiment, the ejection handle is slidably mounted on one of the side walls of the connector device and is operative to slide lengthwise of the side wall toward and away from the connector body. The release mechanism preferably comprises a slide member movably mounted on the connector device and operable to slide toward and away from the connector body, and a disengageable link mechanism coupled between the ejection handle and the slide member for translating movement of the ejection handle into movement of the slide member when the link mechanism is in an engaged state. The slide member has at least one engaging hook adapted to engage with a forward end face of the data storage medium when the data storage medium is connected to the group of contact pins. The link mechanism is disengaged when a data storage medium is fully inserted in the connector device and the ejection handle is in a first position. The link mechanism becomes engaged only after the ejection handle is manually moved from the first position to an extended position. The connector device may further include a latch mechanism for releasably latching the ejection handle in the first position.

In the present embodiment, the link mechanism comprises first, second and third swingable levers. The first and third swingable levers are rotatably mounted on the connector device, and the second swingable lever is rotatably mounted on the first swingable lever. One end of the first swingable lever is coupled to the ejection handle, and one end of the third swingable lever is coupled to the slide member. A free end of the second swingable lever has a recess formed therein, and the free end of the third swingable has a projection that engages with the recess of the second swingable lever when the ejection handle reaches the extended position. After the projection engages the recess, the first, second and third swingable levers move in unison and thereby translate movement of the ejection handle into movement of the slide member. Preferably, the end of the second swingable lever opposite the free end includes a spring means that engages the first swingable lever to urge the free end of the second swingable lever toward the third swingable lever to facilitate engagement of the recess with the projection.

Additional features and advantages of the present invention are achieved in a connector device comprising:

a housing having an opening at a first end and a space for receiving the data storage medium, the space extends from the opening of the housing to a second end of the housing;

a plurality of contacts positioned in the second end of the housing for establishing an electrical interconnection to the data storage medium in the space;

a first movable member movable along the length of the housing and capable of being set to first, second and third extension positions in that order in a direction away from the housing so that, in the first position, the first movable member extends to a zero or slight extent from the first end of the housing;

a transmitting member connected at one end to the first movable member such that, when the first movable member is situated between the first position and the second position, a movement of the first movable member toward the first position is transmitted to the other end of the transmitting member as a normal-direction force directed toward the second end of the housing, such that, when the first movable member is situated between the second position and the third position, the first movable member is latched, and that, when the first movable member is situated in the third position, a movement of the first movable member toward the first position is transmitted to the other end of the transmitting member as a reverse-direction force directed toward the first end of the housing; and a second movable member connected to the other end of the transmitting member and, together with the data storage medium, movable along the length of the housing in unison such that, when the normal-direction force is received from the transmitting member with the movement of the first movable member to the second end of the housing, the second movable member is moved toward the second end of the housing to allow the data storage medium to be connected to the contacts and, when the reverse-direction force is received from the transmitting member, the second movable member is moved to the first end of the housing to allow the data storage medium to be disconnected from the contacts.

According to an embodiment of the present invention, the connector device is of such a type that the space is divided into a plurality of sub-spaces in the height of the housing, the sub-space comprising at least two first sub-spaces each holding one memory card therein and at least one second sub-space each holding one hard disc drive package;

the contacts comprise a plurality of independent contacts each provided in a one-to-one correspondence relative to each of the first and second sub-spaces;

the first movable member comprises a plurality of the first movable members each independently operable in a one-to-one correspondence relative to each of the first and second sub-spaces; and the second movable member comprises a plurality of the second movable members independently operable in a one-to-one correspondence relative to each of the first and second sub-spaces.

According to the connector device of the present invention, when the movable member is situated between the first position and the second position, the transmitting member is moved toward the contacts side in association with the pushing of the movable member to the first position to allow the data storage medium to be connected to the connector device. The movable member, when being set to the first position, extends to a zero or slight extent from the forward end of the housing, making it less subject to impacts or shocks.

With the first movable member set to the third position, the second movable member is moved by the transmitting member to the insertion opening side of the housing in association with the pushing of the first movable member to the first position, so that the data storage medium is disconnected from the connector device.

With the first movable member set between the second position and the third position, the transmitting member is latched and, therefore, it is necessary to withdraw the movable member up to the third position when the data storage medium is to be disconnected.

BRIEF DESCRIPTION OF THE DRAWINGS

FIG. 7 is a top view showing the upper release mechanism when a data storage medium is connected to the connector device; and FIG. 8 is a plan view showing an upper release mechanism in a disconnected state corresponding to FIG. 7.

DETAILED DESCRIPTION OF THE PREFERRED EMBODIMENTS

In the Figures, X, Y and Z represent the width, length and thickness directions, respectively, of a connector device 11 and data storage device.

Figure 1:
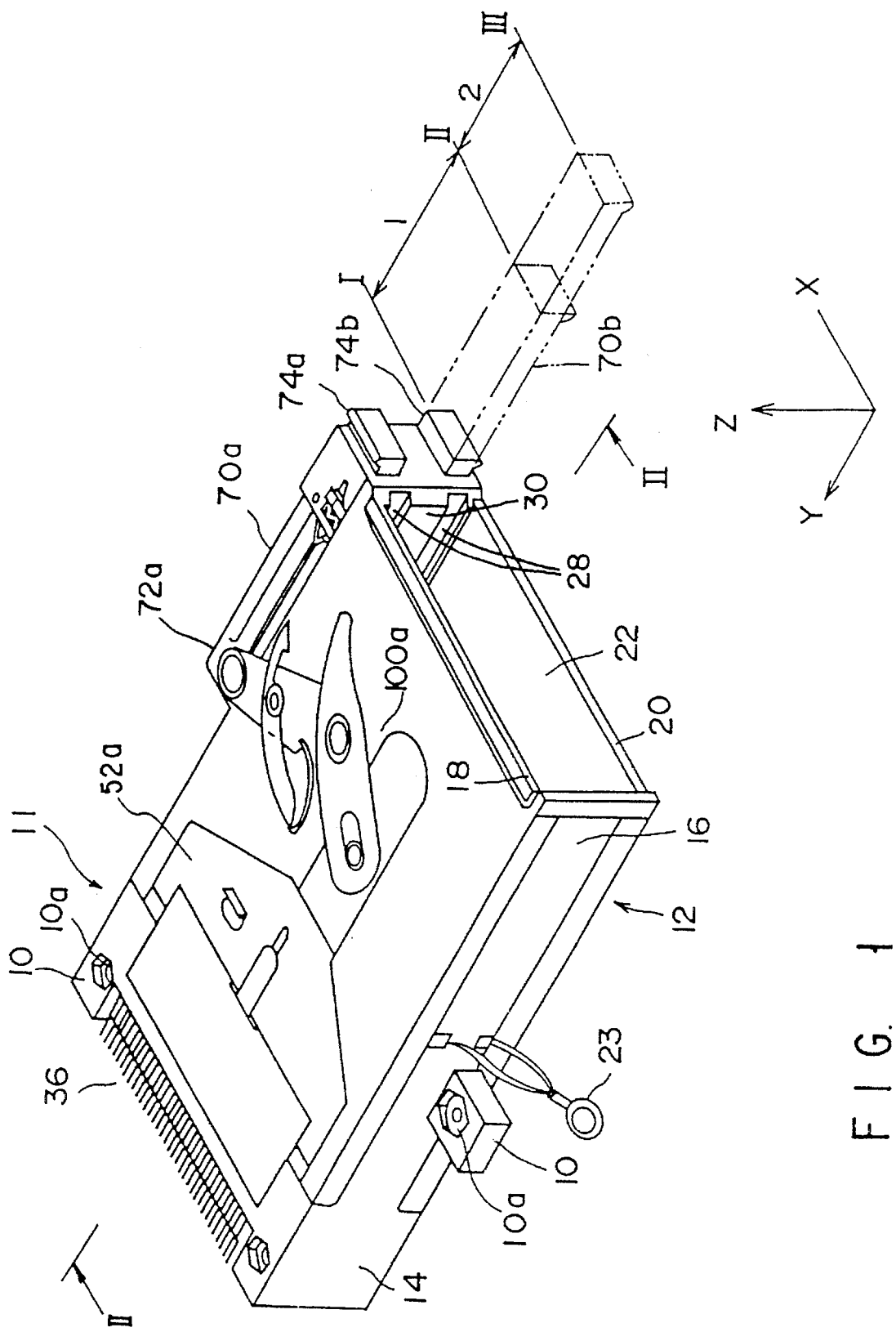
FIG. 1 is a perspective view showing a connector device according to one embodiment of the present invention.

In FIG. 1, the connector device of the present invention includes a housing 12 and connector body 14 connected at one end of the housing. The housing 12 and connector body 14 may be so constructed as to be detachable from each other.

Proper mount members 10 are provided on the housing 12 and connector body 14 for mounting the device 11 to an electronic device, such as a personal, laptop or notebook computer.

The housing 12 has a pair of side walls 16 defining its opposed side surfaces and top and bottom housing plates 18 and 20 defining its top and bottom surfaces. The housing 12 has an insertion hole or opening 22 at the other longitudinal end. The housing plates 18 and 20 are made of a metal and preferably grounded.

Figure 2:
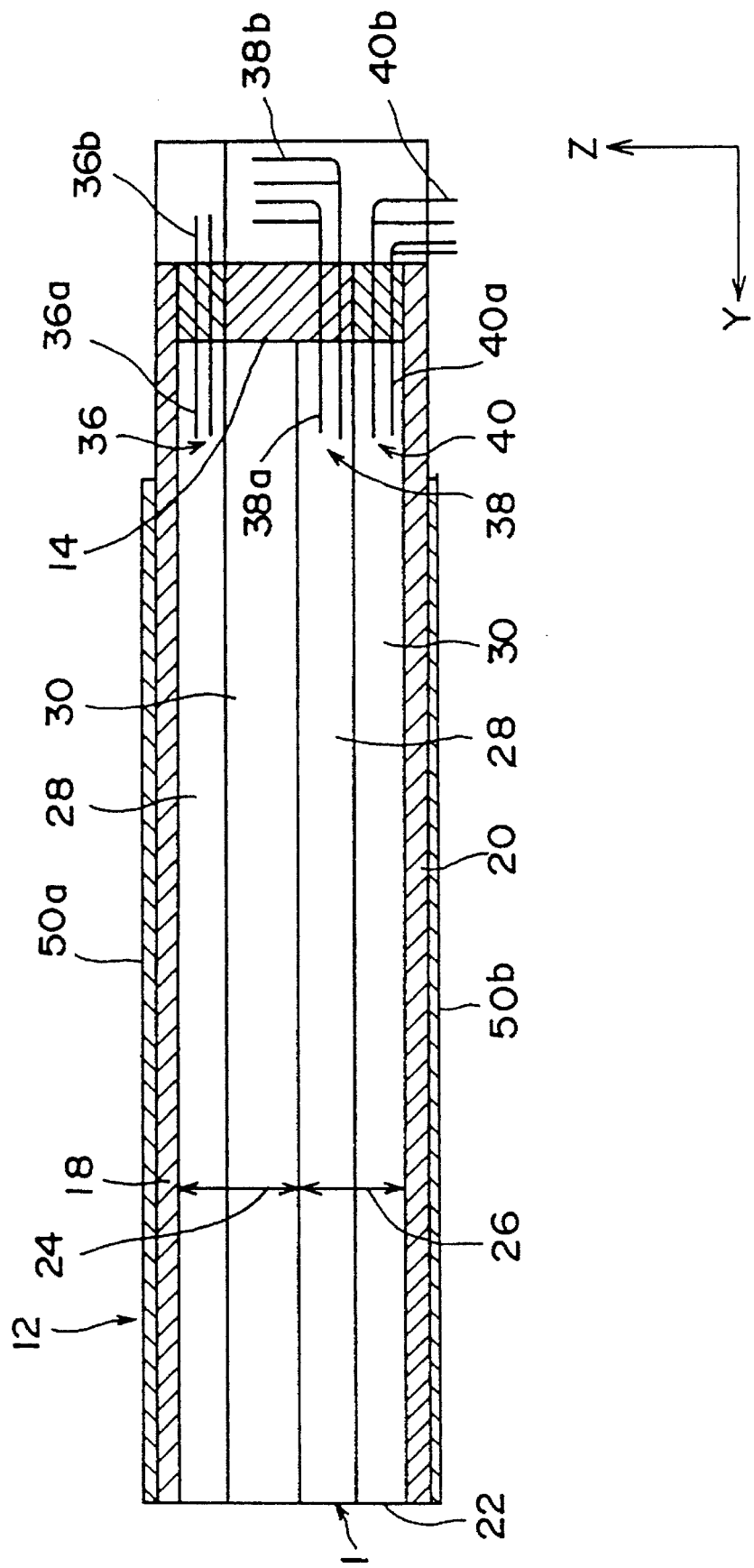
FIG. 2 is a cross-sectional view as taken along line II—II in FIG. 1.

As shown in FIG. 2, the inner space of the housing 12 communicating with the insertion hole 22 defines a first deck 24 and second deck 26 in the Z direction. The first and second decks 24 and 26 can store corresponding memory cards and the first and second decks 24 and 26 together can store a single HDD package. Thus, the connector device 11 can store either one or two memory cards (application B) or one HDD package (application A).

The connector body 14 has three sets of metal pin contact groups in the Z direction. That is, the connector body 14 has an upper-stage pin contact group 36 with one end 36a of each pin to be connected to an I/O connector of a memory card inserted in the first deck 24, a middle-stage pin contact group 38 with one end 38a of each pin to be connected to an I/O connector of a memory card inserted in the second deck 26 and a lower-stage pin contact group 40 with one end 40a of each pin to be connected to an I/O connector of an HDD package. Other terminals 36b, 38b and 40b of the pin contact groups 36, 38 and 40 are connected to a proper circuit board (not shown), such as an interface board.

Figure 3:
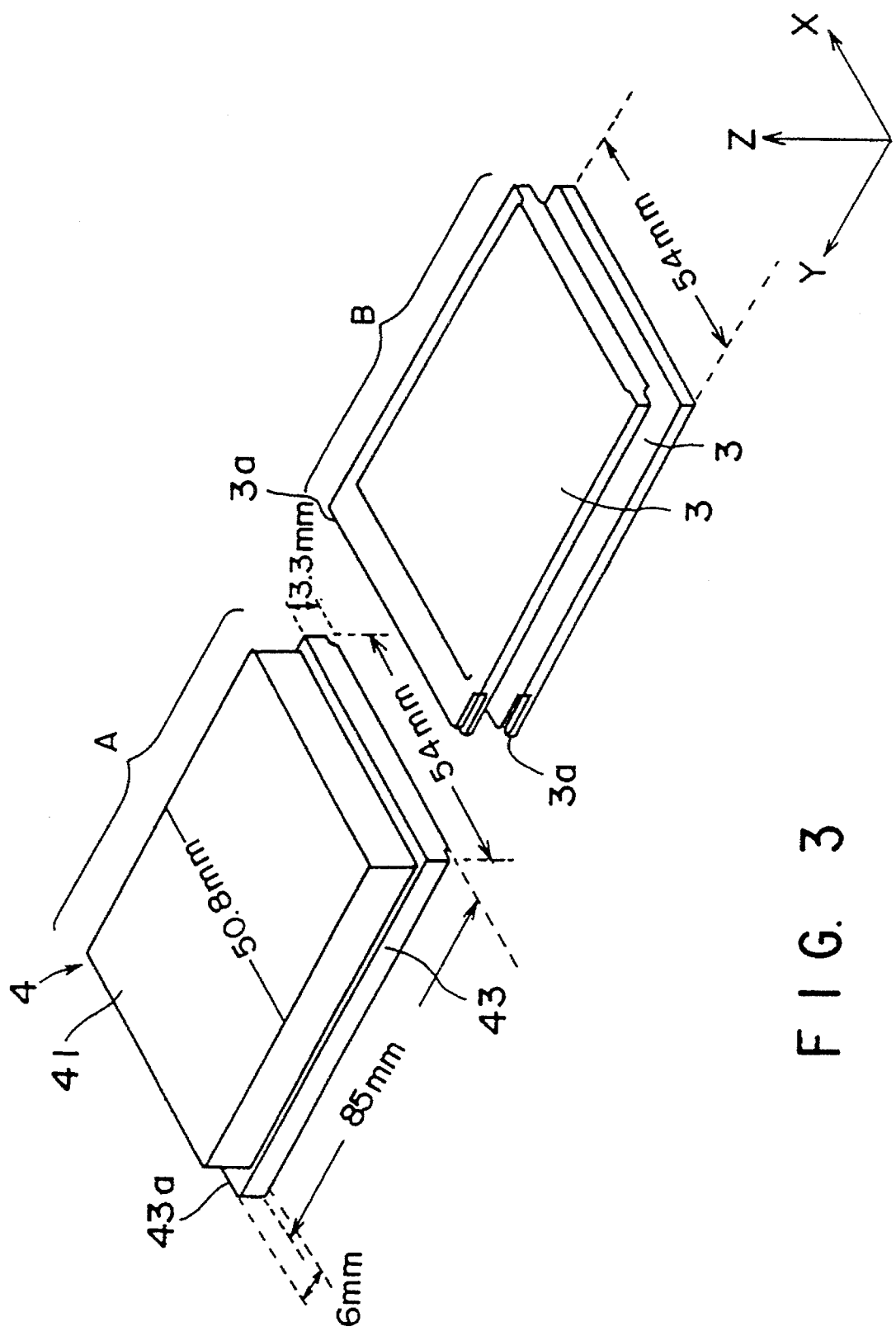
FIG. 3 is a perspective view showing one hard drive package and two memory cards usable in the connector device.

Referring to FIG. 3, in application B wherein two memory cards are to be inserted into the connector device 11, each memory card 3 is typically comprised of a nonvolatile RAM and can be withdrawn out of the connector device 11 after its data has been loaded into a computer system 11. An I/O connector (not shown) into which a pin contact group (36 and 38) of the connector device 11 is inserted is provided on a front end 3a side of each memory card. The maximum width of each memory card 3 is, for example, 54 mm.

A typical HDD package 4 is comprised of a thin-type package having a housing 41 containing a thin-type HDD, such as a 1.8-inch disc drive, and a base plate 43 on which the housing 41 is mounted. Further, an I/O connector (not shown) into which the lower-stage pin contact group 40 of the connector device 11 may be inserted is provided on a front end 43a side of the base plate 43.

The base plate 43 of the HDD package 4 is typically 85 mm long, 54 mm wide, and 3 mm high. The housing 41 has a width of 50.8 mm and the distance from the front end edge of the base plate 43 to the front end edge of the housing 41 is 6 mm. The HDD package 4 can be inserted in the connector device in the same manner as a memory card 3.

Figure 4:
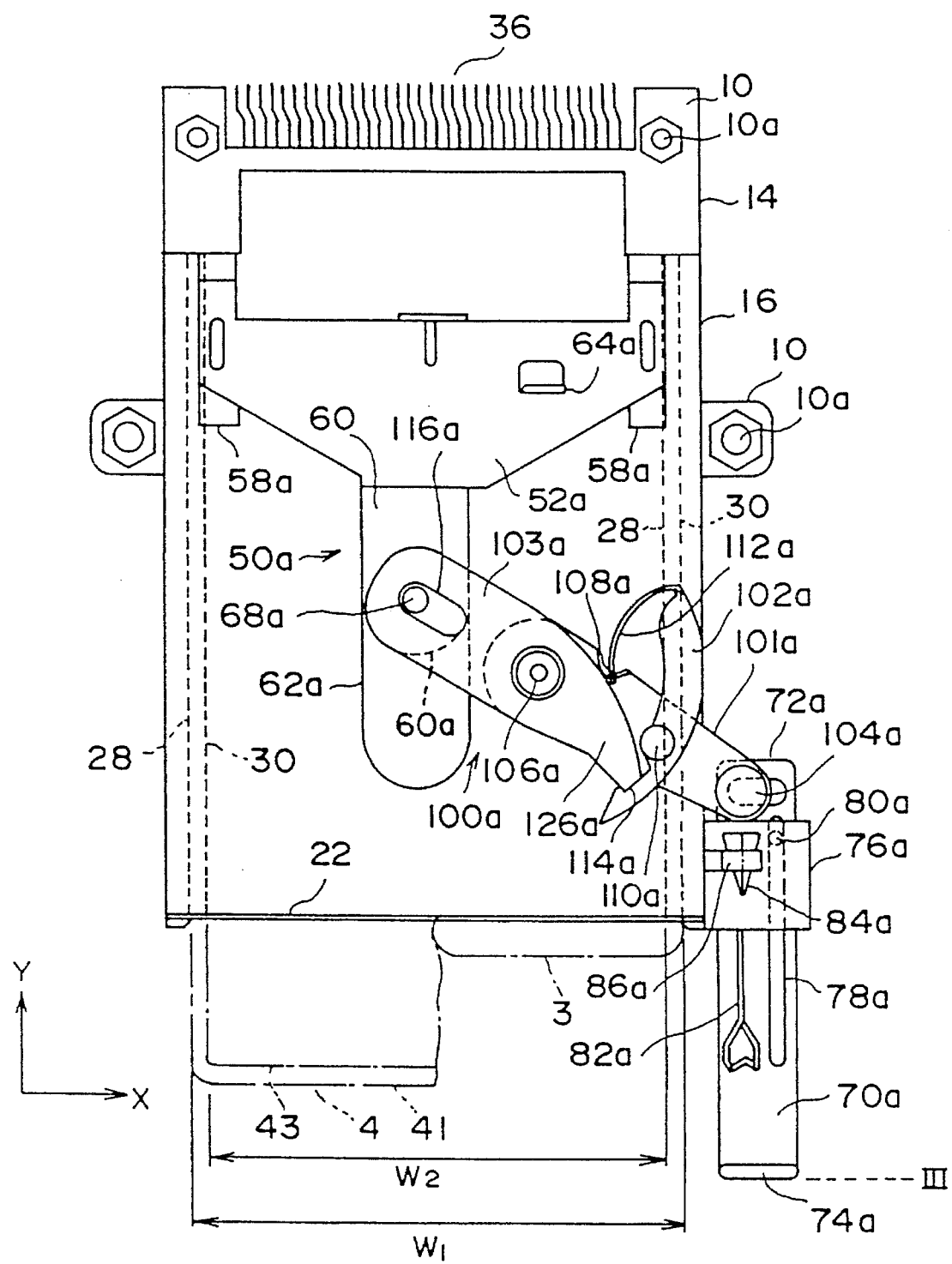
FIG. 4 is a plan view showing an upper release mechanism of the connector device as viewed from the top side of the connector device.

As shown in FIGS. 2 and 4, slots 28 are provided, in the Y direction, one in the inner surface of the housing side wall 16 corresponding to the upper portion of the first deck 24 and one in the inner surface of the housing side wall 16 corresponding to the upper portion of the second deck 26.

Slots 30 are provided, in the Y direction, one in the inner surface of the housing side wall 16 corresponding to the lower portion of the first deck 24 and one in the inner surface of the housing side wall 16 corresponding to the lower surface of the second deck 26 so as to allow the HDD package 4 to be inserted and withdrawn into and out of the HDD package 4.

The X-direction width W1 between the slots 28 corresponds to the width (54 mm) of a memory card 3 and the X-direction width W2 between the HDD slots 30 corresponds to the width (50.8 mm) of an HDD housing 41.

Because the width W1 of a memory card 3 is greater than the width W2 of the slots 30, it is impossible to inadvertently connect a memory card 3 to the lowest contact group.

Further, the housing 12 has an upper release mechanism 50a corresponding to the first deck 24 and lower release mechanism 50b corresponding to the second deck 26. The upper and lower release mechanisms 50a and 50b are basically identical to each other. In FIG. 4, those constituent parts of the upper release mechanism 50a are shown with reference character a added thereto and those constituent parts of the lower release mechanism 50b are shown with reference character b added thereto. For brevity's sake, the upper release mechanism 50a will be explained below as a representative example, unless otherwise stated.

In FIG. 4, the upper release mechanism 50a has a slide plate 52a, a handle 70a for slidably moving the slide plate 52a, and a link mechanism 100a. The slide plate 52a can be slidably moved in the Y direction along the surface of the housing plate 18.

Figure 5:
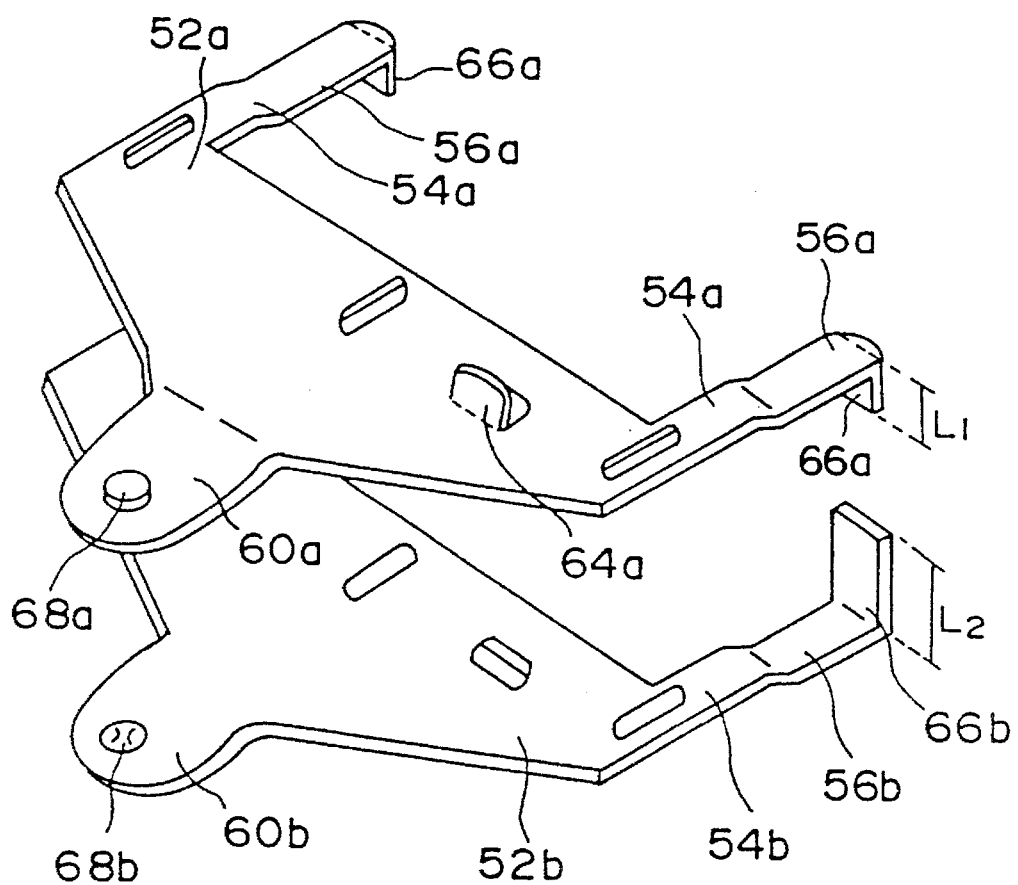
FIG. 5 is a perspective view showing slide plates for upper and lower release mechanisms of the connector.

As shown in FIG. 5, a pair of arms 54a are provided on respective side ends of the slide plate 52a such that they extend toward the connector body 14. Each arm 54a has a bent portion 56a stepped relative to the slide plate 52a. Each bent portion 56a of the arm 54a extends toward the inner surface side of the housing plate 18 through a cutout 58a provided on each end of the connector body 14 side of the housing plate 18. Similarly, the U-shaped base end 60a of the slide plate 52a is stepped relative to the slide plate 52a such that it is projected toward the inner surface side of the housing plate 18 through a U-shaped cutout 62a in a middle of the housing plate 18.

The arms 54a and U-shaped base end 60a of the slide plate 52a slide in corresponding cutouts 58a and 62a in the housing plate 18. Cutouts 58a and 62a allow the slide plate 52a to move in the Y direction, while restricting movement in the X direction.

A struck-out raised section 64a is provided in the slide plate 52a so as to be abutted against a second swing lever as will be set out below. The ejection end of the bent portion 56a of the slide plate's arm 54a is further bent to provide an ejection hook 66a to engage the socket-side end face of the memory card 3. A button-like projection 68a is provided on the U-shaped base end 60a of the base plate 52a.

Referring again to FIG. 4, the U-shaped base end 60a of the slide plate 52a is connected by the link mechanism 100a to a rear end portion 72a of the rod-like handle or ejection button 70a. A forward end 74a of the handle 70a serves as a free end. The handle 70a is slidable, in the Y direction, in and along a guide 76a provided on one side wall 16. The guide 76a is formed integral with, for example, the housing 12. The handle 70a has a guide groove 78a along its longitudinal direction. A guide pin 80a fixed to the guide 76a is inserted into the guide groove 78a. Thus the handle 70a is slidably moved in the Y direction, while being guided by the guide groove 78a and guide pin 80a, by pushing and pulling the free end 74a of the handle 70a in the Y direction.

When the handle 70a is latched by a latching mechanism as will be set out below, the free end 74a of the handle 70a is slightly projected from the front edge of the guide 72a. This position is given as a first position I in FIG. 1 to which reference is invited. In the first position I, the free end 74a of the handle 70a is so set that it extends flush with, or slightly from, the forward edge of the housing 12. With the handle 70a pulled backward, the free end 74a of the handle 70 can be placed to second and third positions II and III in FIG. 1 where it is further extended in that order relative to the forward edge of the housing. The third position III corresponds to the position where the handle 70a is projected to a greatest extent. Here a first extension stroke 1 (see FIG. 1) corresponds to a stroke involved between the first position I and the second position II and a second extension stroke 2 corresponds to a stroke involved between the second position II and the third position III.

The handle 70a is normally so loaded as to be projected, by a proper means (not shown) such as a wire means, out of the forward edge of the guide 76a. This load sets the handle 70a to the second position II when a latching mechanism as will be set forth below does not act upon the handle 70.

The connector device 11 has a latching mechanism for latching the handle 70a to the first position I. As the latching mechanism, for example, use can be made of a known mechanism comprising a spring 82a provided at the handle 70a, latching pin 84a provided at the guide 76a, and leaf spring 86a for urging the pin 84a. A multi-stepped section area is provided at the forward end of the spring 82a.

Figure 6:
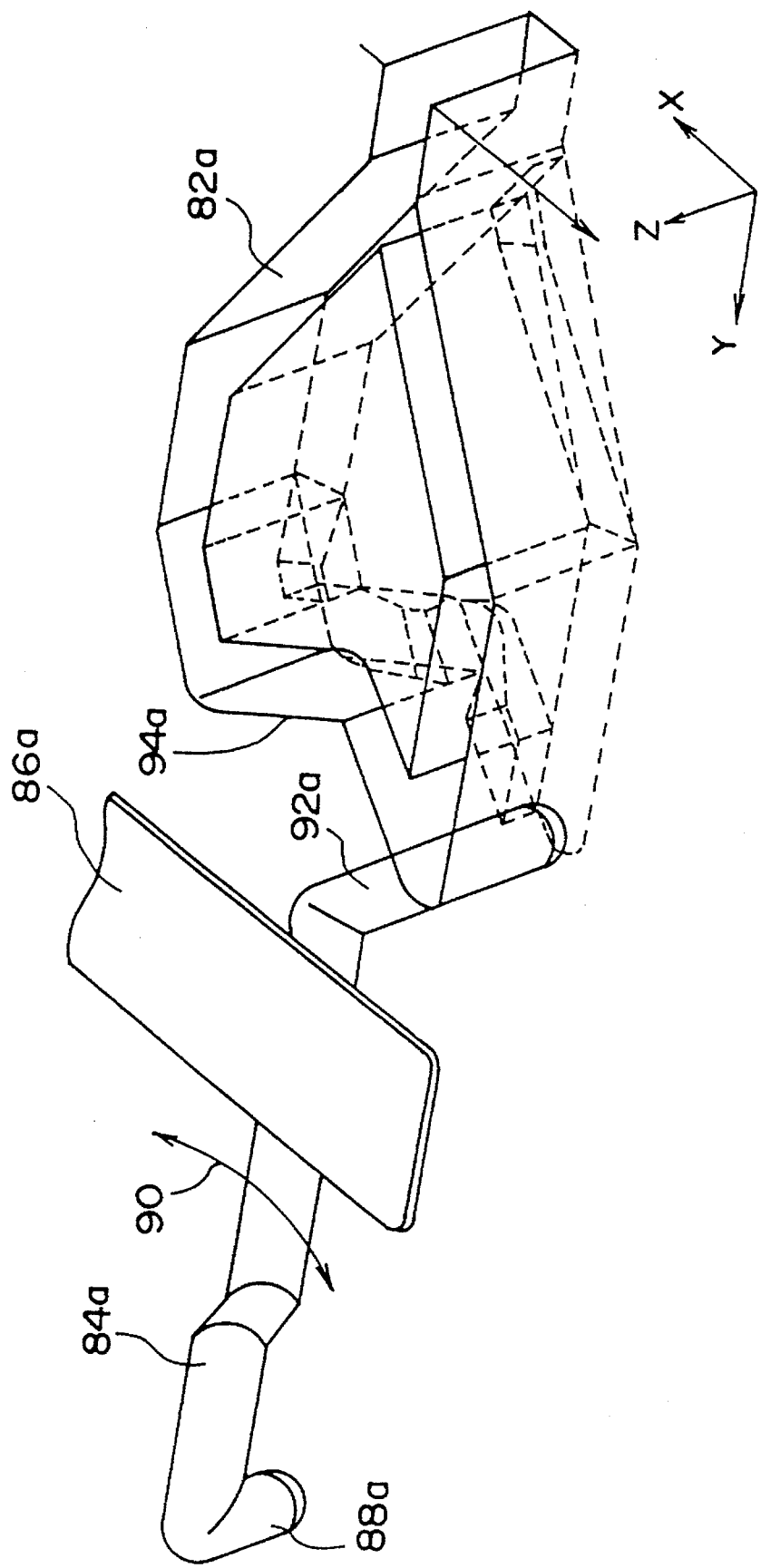
FIG. 6 is an enlarged perspective view showing a latch mechanism of the connector device.

The latching pin 84a, as shown in FIG. 6 in particular, has its one end 88a supported on the guide 76a and is swingable in a direction 90 as indicated by double arrows in FIG. 6. The other end 92a of the latching pin 84a is urged by the leaf spring 86a in a downward direction.

When the handle 70a is pushed to the first position I, the latching pin 84a engages a v-shaped area 94a of the spring 82a and the handle 70a is latched to the first position I against such a force as to try to extend toward the second position II.

When the handle 70a is further pushed from the first position I, the latching pin 84a is moved along a V-shaped area 94a, thus disengaging the latch pin 84a from the spring 82a.

Referring again to FIG. 4, the link mechanism 100a has first, second and third swingable levers 101a, 102a and 103a, respectively. The first swingable lever 101a has one end supported by a rotation shaft 104a at the rear end portion 72a of the handle 70a and the other end supported by a rotation shaft 106a on the housing plate 18. A cutout 108a is provided at the side edge of the connector body 14 side of the first swingable lever 101a.

The second swingable lever 102a is supported by a rotation shaft 110a in a substantially middle portion of the second swingable lever 102. One end portion 112a of the second swingable lever 102a serves as a spring means for engaging the cutout 108a of the first swingable lever 101a. Upon being pushed from the cutout 108a of the first swingable lever, the spring means 112a exerts such a force as to move the second swingable lever 102a away from the first swingable lever 101a. A recess 114a is provided in the inner side of the other end of the second swingable lever 102a.

A substantially middle portion of the third swingable lever 103a is supported on the rotation shaft 106a of the first swingable lever 101a. The third swingable lever 103a has an elongated hole 116a at one end portion. The button-like projection 68a of the U-shaped base end portion 60a of the slide plate 52a is loosely fitted in the elongated hole 116a. The other end of the third swingable lever 103a is formed as a projection 126a and is engageable with the recess 114a of the second swingable lever 102a. The link mechanism 100a moves the slide plate 52a as the handle 70a slides.

The lower ejection mechanism 50b has basically the same configuration as that of the upper ejection mechanism 50a except for the fact that, as shown in FIG. 5, the Z-direction length L1 of the ejection hooks 66a of the slide plate 52a for the upper ejection mechanism 50a is great enough to allow a single memory card 3 to be withdrawn out of the first deck 24 but the Z-direction length L2 of the ejection hooks 66b of the slide plate 52b for the lower ejection mechanism 50b is great enough to allow either an HDD package 4 or a memory card 3 to be withdrawn out of the second deck 26.

The operation of the connector device 11 equipped with the ejection mechanisms 50a and 50b will be explained below, noting that the connector device 11 is mounted in a computer system.

In the case where the memory card 3 is attached and detached to and from the computer system through the use of the connector device 11, the upper ejection mechanism 50a and/or lower ejection mechanism 50b are/is employed.

When, for example, one memory card 3 is mounted in the computer system, it is inserted via the insertion hole 22 into, for example, the slot 28 of the first deck 24. By so doing, the I/O connector 31 of the memory card 3 is matingly connected to the upper-stage side pin contact group of the connector body 14. It is thus possible to connect the memory card 3 to the computer system.

Referring to FIG. 7, during the insertion of a memory card 3 into the slot 28, the forward end face of the memory card 3 engages the ejection hook 66a of the slide plate 52a, and the slide plate 52a is moved toward the connection body 14 side. As a result, the first swingable lever 101a is rotated around the rotation shaft 106, moving the handle 70a toward the connector body 14 side as shown in FIG. 7. When the handle 70a is situated in the first position, it is latched to the first position I through the mutual engagement of the spring 82a and latching pin 84a.

Alternatively, the memory card 3 may be guided to the connector body 14 by moving the slide plate 52a by manually operating the handle 70a.

Upon detachment of the memory card 3 from the connector device 11, the handle 70a is further pushed from the first position I causing the latch pin 82a to disengage from the spring 80a and to be pushed up to the second position II. As will be seen from the above, the handle 70a is now ready to be operated by the user. In this state, the slide plate 52a is not moved.

As shown in FIG. 4, the handle 70a is then withdrawn from the second position II to the third position III (the second extension stroke 2). This causes the first swingable lever 101a, together with the third swingable lever 103a, to be swung toward the insertion hole 22 side, so that the projection 126a of the third swingable lever 103a engages the recess 114a of the second swingable lever 102a.

When, in this state, the handle 70a is pushed back to the first position I, then the first, second and third swingable levers 101a, 102a and 103a are swung, as one unit, toward the connector body 14 side as shown in FIG. 8. When the second swingable lever 102 abuts against the struck-out raised section 64a of the slide plate, a positive engagement is ensured between the first swingable lever 101a and the third swingable lever 103a. When the swingable levers 101a, 102a and 103a are further swung, the slide plate 52a together with the memory card 3 is moved as one unit toward the insertion hole 22 side, thus allowing the memory card 3 to be released from the connector body 14. When the handle 70a reaches the first position I, the slide plate 52a stops its movement at which time the memory card 3 can be removed from the insertion hole 22.

The setting of the second extension stroke 2 enables the memory card 3 to be ejected out of the connector device only when it is so desired. It is thus possible to prevent an inadvertent ejection of the memory card 3 during the operation of a computer or its associated device.

Even in the case where the memory card 3 is inserted into the second deck 26 and connection is made between the I/O connector 31 and the middle-stage pin connector group 38, it is also possible to similarly release the memory card 3 from the connector body so that it can be ejected through the lower ejection mechanism 50b.

Since it is possible to move the upper and lower ejection mechanisms 50a and 50b independent of each other, when two memory cards 3 are stored in the connector device 11 at a time, it is equally possible to individually independently attach and detach the memory cards 3 to and from the connector device 11.

In the case where the HDD package 4 is attached and detached to and from a computer system, only the lower ejection mechanism 50b can be employed for HDD package ejection.

When the HDD package 4 is to be mounted on the computer system, it is inserted via the insertion hole 22 into the housing 12, while being guided along the slots 30, to allow the I/O connector 45 of the HDD package to be matingly connected to the lower-stage pin contact group 40. By so doing, the HDD package 4 is connected to the computer system and, in this state, the ejection hook 66b of the slide plate 52b at the lower ejection mechanism 50b engages the end face of the I/O connector 45 side of the HDD package 4. The HDD package 4 can thus be attached and detached to and from the computer system as in the case of the memory card 3.

The present invention is not restricted to the aforementioned embodiment and various changes or modifications of the present invention can be made without departing from the spirit and scope of the present invention. For example, although the connector device 11 of the aforementioned embodiment has been explained as being capable of being employed for two kinds of data storage media, that is, a memory card 3 or an HDD package 4, it may be possible to limit the memory card 3 and HDD package 4 to their own individual usages only. Many more memory cards and/or HDD packages 4 may be stored in the connector device by increasing the number of decks correspondingly. It may be possible to provide those decks not only for a combined usage of memory cards and HDD packages but also for use with memory cards only and/or HDD packages only.

Any proper mechanism may be provided at the housing's insertion opening 22 to prevent the data storage mediums from slipping down.

According to the connector device of the present invention, since the end 74a of the handle 70a does not protrude from the device during the connection period of a data storage medium, it is less liable to be accidentally impacted or shocked. Inadvertent ejection of a data storage medium is therefore prevented. Further it is also possible to prevent any operational errors because the data storage medium cannot be ejected from the connector device unless the handle 70a is first withdrawn through both the first and second extension strokes.

What is claimed is:

1. A connector device for connecting to a data storage medium comprising:

a housing having an opening at a first end and a space for receiving the data storage medium, the space extends from the opening of the housing to a second end of the housing;

a plurality of contacts positioned in the second end of the housing for establishing an electrical interconnection to the data storage medium in the space;

a first movable member movable along the length of the housing and capable of being set to first, second and third extension positions in that order in a direction away from the housing so that, in the first position, the first movable member extends to a zero or slight extent from the first end of the housing;

a transmitting member connected at one end to the first movable member such that, when the first movable member is situated between the first position and the second position, a movement of the first movable member toward the first position is transmitted to the other end of the transmitting member as a normal-direction force directed toward the second end of the housing, such that, when the first movable member is situated between the second position and the third position, the first movable member is latched, and that, when the first movable member is situated in the third position, a movement of the first movable member toward the first position is transmitted to the other end of the transmitting member as a reverse-direction force directed toward the first end of the housing; and a second movable member connected to the other end of the transmitting member and, together with the data storage medium, movable along the length of the housing in unison such that, when the normal-direction force is received from the transmitting member with the movement of the first movable member to the second end of the housing, the second movable member is moved toward the second end of the housing to allow the data storage medium to be connected to the contacts and, when the reverse-direction force is received from the transmitting member, the second movable member is moved to the first end of the housing to allow the data storage medium to be disconnected from the contacts.

2. A connector device according to claim 1, wherein the space is divided into a plurality of sub-spaces in the height of the housing, the sub-space comprising at least two first sub-spaces each holding one memory card therein and at least one second sub-space each holding one hard disc drive package.

3. A connector device according to claim 2, wherein the contacts are replaced by a plurality of independent contacts each provided in a one-to-one correspondence relative to each of the first and second sub-spaces.

4. A connector device according to claim 2, wherein the first movable member comprises a plurality of the first movable members each independently operable in a one-to-one correspondence relative to each of the first and second sub-spaces.

5. A connector device according to claim 2, wherein the second movable member comprises a plurality of the second movable members independently operable in a one-to-one correspondence relative to each of the first and second sub-spaces.

6. A connector device for connecting a data storage medium to an electronic apparatus, comprising:

a pair of opposing side walls spaced at an interval substantially equal to the width of the data storage medium;

a connector body provided at one end of said opposing side walls and having at least one group of contact pins disposed therein for connecting to the data storage medium; and a disengageable release mechanism for ejecting the data storage medium from the connector device upon manual operation of an ejection handle, said release mechanism being disengaged when a data storage medium is fully inserted in the connector device and the ejection handle is in a first position, said release mechanism becoming engaged and operable to eject the data storage device only after the ejection handle is manually moved from the first position to an extended position, whereby inadvertent ejection of the data storage medium is avoided.

7. The connector device of claim 6 further comprising a latch mechanism for releasably latching the ejection handle in said first position.

8. The connector device of claim 6 wherein the ejection handle is slidably mounted on one of the side walls of the connector device and is operative to slide lengthwise of the side wall toward and away from the connector body, and wherein the release mechanism further comprises:

a slide member movably mounted on said connector device and operable to slide toward and away from said connector body, said slide member having at least one engaging hook adapted to engage with a forward end face of the data storage medium when the data storage medium is connected to said at least one group of contact pins; and a disengageable link mechanism coupled between the ejection handle and the slide member for translating movement of the ejection handle into movement of the slide member when the link mechanism is in an engaged state, said link mechanism being disengaged when a data storage medium is fully inserted in the connector device and the ejection handle is in a first position, said link mechanism becoming engaged only after the ejection handle is manually moved from the first position to an extended position.

9. The connector device of claim 8 wherein said link mechanism comprises:

a first swingable lever rotatably mounted on the connector device and having one end coupled to the ejection handle;

a second swingable lever rotatably mounted on the first swingable lever, a free end of said second swingable lever having a recess formed therein; and a third swingable lever rotatably mounted on the connector device, one end of the third swingable lever being connected to the slide member and the other end of the third swingable lever having a projection that engages with the recess of the second swingable lever when the ejection handle reaches said extended position, the first, second and third swingable levers thereafter moving in unison and thereby translating movement of the ejection handle into movement of the slide member.

10. The connector device of claim 7 wherein the latch mechanism includes a spring means that, upon release of the ejection handle from the latch mechanism, pushes the ejection handle outward from the connector device to a second position to facilitate gripping of the ejection handle by an operator.

11. The connector device as recited in claim 10 wherein the end of the second swingable lever opposite the free end includes a spring means that engages the first swingable lever to urge the free end of the second swingable lever toward the third swingable lever to facilitate engagement of said recess with said projection.

12. A connector device for connecting a data storage medium to an electronic apparatus, comprising:

a pair of opposing side walls spaced at an interval substantially equal to the width of the data storage medium;

a connector body provided at one end of said opposing side walls and having at least one group of contact pins disposed therein for connecting to the data storage medium;

a slide member movably mounted on said connector device and operable to slide toward and away from said connector body, said slide member having at least one engaging hook adapted to engage with a forward end face of the data storage medium when the data storage medium is connected to said at least one group of contact pins;

an ejection handle slidably mounted on one of the side walls and being operative to slide lengthwise of the side wall toward and away from the connector body; and a disengageable link mechanism coupled between the ejection handle and the slide member for translating movement of the ejection handle into movement of the slide member when said link mechanism is in an engaged state, said link mechanism being disengaged when a data storage medium is fully inserted in the connector device and the ejection handle is in a first position, said link mechanism becoming engaged only after the ejection handle is manually moved from the first position to an extended position, whereby inadvertent ejection of the data storage medium is avoided.

13. The connector device of claim 12 further comprising a latch mechanism for releasably latching the ejection handle in said first position.

14. The connector device of claim 13 wherein the latch mechanism includes a spring means that, upon release of the ejection handle from the latch mechanism, pushes the ejection handle outward from the connector device to a second position to facilitate gripping of the ejection handle by an operator.

15. The connector device of claim 12 wherein said link mechanism comprises:

a first swingable lever rotatably mounted on the connector device and having one end coupled to the ejection handle;

a second swingable lever rotatably mounted on the first swingable lever, a free end of said second swingable lever having a recess formed therein; and a third swingable lever rotatably mounted on the connector device, one end of the third swingable lever being connected to the slide member and the other end of the third swingable lever having a projection that engages with the recess of the second swingable lever when the ejection handle reaches said extended position, the first, second and third swingable levers thereafter moving in unison and thereby translating movement of the ejection handle into movement of the slide member.

16. The connector device as recited in claim 15 wherein the end of the second swingable lever opposite the free end thereof includes a spring means that engages the first swingable lever to urge the free end of the second swingable lever toward the third swingable lever to facilitate engagement of said recess with said projection.

* * * * *